United States Patent
Newhouse et al.

(10) Patent No.: US 8,068,974 B2
(45) Date of Patent: Nov. 29, 2011

(54) METHODS AND SYSTEMS FOR DETERMINING DRIVER EFFICIENCY AND OPERATING MODES IN A HYBRID VEHICLE

(75) Inventors: Vernon L. Newhouse, Farmington, MI (US); Kevin S. Kidston, New Hudson, MI (US); Carlene M. Sienkiewicz, Brighton, MI (US); Jonathan R. Schwarz, Clawson, MI (US); Emily R. Wu, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1111 days.

(21) Appl. No.: 11/852,879

(22) Filed: Sep. 10, 2007

(65) Prior Publication Data

US 2009/0066495 A1   Mar. 12, 2009

(51) Int. Cl.
  *G06F 19/00*   (2011.01)
(52) U.S. Cl. ....... 701/123; 701/22; 340/439; 180/65.21; 180/65.265; 180/65.27; 180/65.275; 180/65.28; 180/65.285; 180/65.29
(58) Field of Classification Search .......... 701/22, 701/123; 340/439; 180/65.1–65.29
See application file for complete search history.

(56) References Cited

U.S. PATENT DOCUMENTS

| | | | |
|---|---|---|---|
| 5,693,876 A * | 12/1997 | Ghitea et al. | 73/114.53 |
| 5,758,299 A | 5/1998 | Sandborg et al. | |
| 6,201,312 B1 * | 3/2001 | Shioiri et al. | 290/40 C |
| 6,411,888 B1 | 6/2002 | Weisman, II | |
| 6,480,106 B1 * | 11/2002 | Crombez et al. | 340/461 |
| 7,206,689 B1 | 4/2007 | Johnson | |
| 7,454,962 B2 | 11/2008 | Nishiyama et al. | |
| 2002/0171541 A1 | 11/2002 | Crombez et al. | |
| 2005/0209771 A1 | 9/2005 | Ishiguro | |
| 2006/0166783 A1 * | 7/2006 | Tamai et al. | 477/7 |
| 2007/0027593 A1 | 2/2007 | Shah et al. | |
| 2007/0143002 A1 | 6/2007 | Crowell et al. | |
| 2007/0256481 A1 | 11/2007 | Nishiyama et al. | |
| 2008/0120175 A1 | 5/2008 | Doering | |
| 2009/0043467 A1 * | 2/2009 | Filev et al. | 701/57 |

FOREIGN PATENT DOCUMENTS

| | | | |
|---|---|---|---|
| JP | 11220807 A | | 8/1999 |
| JP | 2007125921 A | * | 5/2007 |
| WO | 2006018944 A1 | | 2/2006 |

OTHER PUBLICATIONS

U.S. Office Action for U.S. Appl. No. 11/852,850 mailed May 6, 2011.

* cited by examiner

*Primary Examiner* — Thomas Black
*Assistant Examiner* — Peter D Nolan
(74) *Attorney, Agent, or Firm* — Ingrassia Fisher & Lorenz P.C.

(57) ABSTRACT

A method for determining driver efficiency in a hybrid vehicle includes the steps of measuring a hybrid vehicle parameter, and calculating driver efficiency based, at least in part, on the hybrid vehicle parameter. The hybrid vehicle parameter is influenced, at least in part, by an action taken by a driver.

13 Claims, 8 Drawing Sheets

METHODS AND SYSTEMS FOR DETERMINING DRIVER EFFICIENCY AND OPERATING MODES IN A HYBRID VEHICLE

TECHNICAL FIELD

The present invention generally relates to the field of hybrid vehicles and, more specifically, to methods and systems for determining driver efficiency and operating modes in a hybrid vehicle.

BACKGROUND OF THE INVENTION

Many of today's vehicles have one or more features to promote fuel efficiency. For example, many vehicles have overdrive or cruise control features. Also, hybrid vehicles today are configured to run in different operating modes, including some operating modes in which the hybrid vehicle uses electrical power, battery power, and/or other alternative power sources to improve fuel efficiency. Certain vehicles also include regenerative braking systems that help convert kinetic energy into electrical energy, and thereby further save fuel and/or energy. In addition, the actions of a driver of a hybrid vehicle can also play a significant role in fuel efficiency. For example, if the driver operates the hybrid vehicle so that the hybrid vehicle's speed or acceleration exceeds a desired range, or if the driver causes the hybrid vehicle to change speeds at large magnitudes very quickly, this can have an adverse effect on the fuel efficiency of the hybrid vehicle. However, it may be difficult for the driver to ascertain whether he or she is driving the hybrid vehicle in an efficient manner, and to ascertain how this can also be related to the current operating mode of the hybrid vehicle. This may be particularly difficult while the driver is operating the hybrid vehicle.

Accordingly, it is desirable to provide methods to determine driver efficiency and an operating mode in a hybrid vehicle. It is also desirable to provide systems to determine driver efficiency and an operating mode in a hybrid vehicle. It is further desirable to provide methods and systems to determine driver efficiency and a relationship with the operating mode in a hybrid vehicle while a driver is operating the hybrid vehicle. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for determining driver efficiency in a hybrid vehicle. The method comprises the steps of measuring a hybrid vehicle parameter, determining an operating mode of the hybrid vehicle, and calculating the driver efficiency based, at least in part, on the hybrid vehicle parameter and the operating mode of the hybrid vehicle. The hybrid vehicle parameter is influenced, at least in part, by an action taken by a driver.

In accordance with another exemplary embodiment of the present invention, a display device for a hybrid vehicle is provided. The display device comprises an input device and a display. The input device is configured to receive driver efficiency. The driver efficiency comprises a measure of an impact of an action taken by a driver of the hybrid vehicle on a fuel efficiency of the hybrid vehicle, based, at least in part, on an operating mode of the hybrid vehicle, and also comprises an indication of an operating mode of the hybrid vehicle. The display is coupled to the input device, and comprises an indicator. The indicator is configured to move between a plurality of positions based, at least in part, on the driver efficiency.

In accordance with a further exemplary embodiment of the present invention, a system for displaying driver efficiency for a hybrid vehicle is provided. The system comprises a sensing unit, a processor, and a display device. The sensing unit is configured to at least facilitate measuring a hybrid vehicle parameter. The hybrid vehicle parameter is influenced, at least in part, by an action taken by a driver. The processor is coupled to the sensing unit, and is configured to at least facilitate determining an operating mode of the hybrid vehicle, and calculating the driver efficiency based, at least in part, on the hybrid vehicle parameter and the operating mode of the hybrid vehicle. The display device is coupled to the processor, and comprises an input device and a display. The input device is coupled to the processor, and is configured to receive the driver efficiency therefrom. The display is coupled to the input device, and comprises an indicator. The indicator is configured to move between a plurality of positions based, at least in part, on the driver efficiency.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
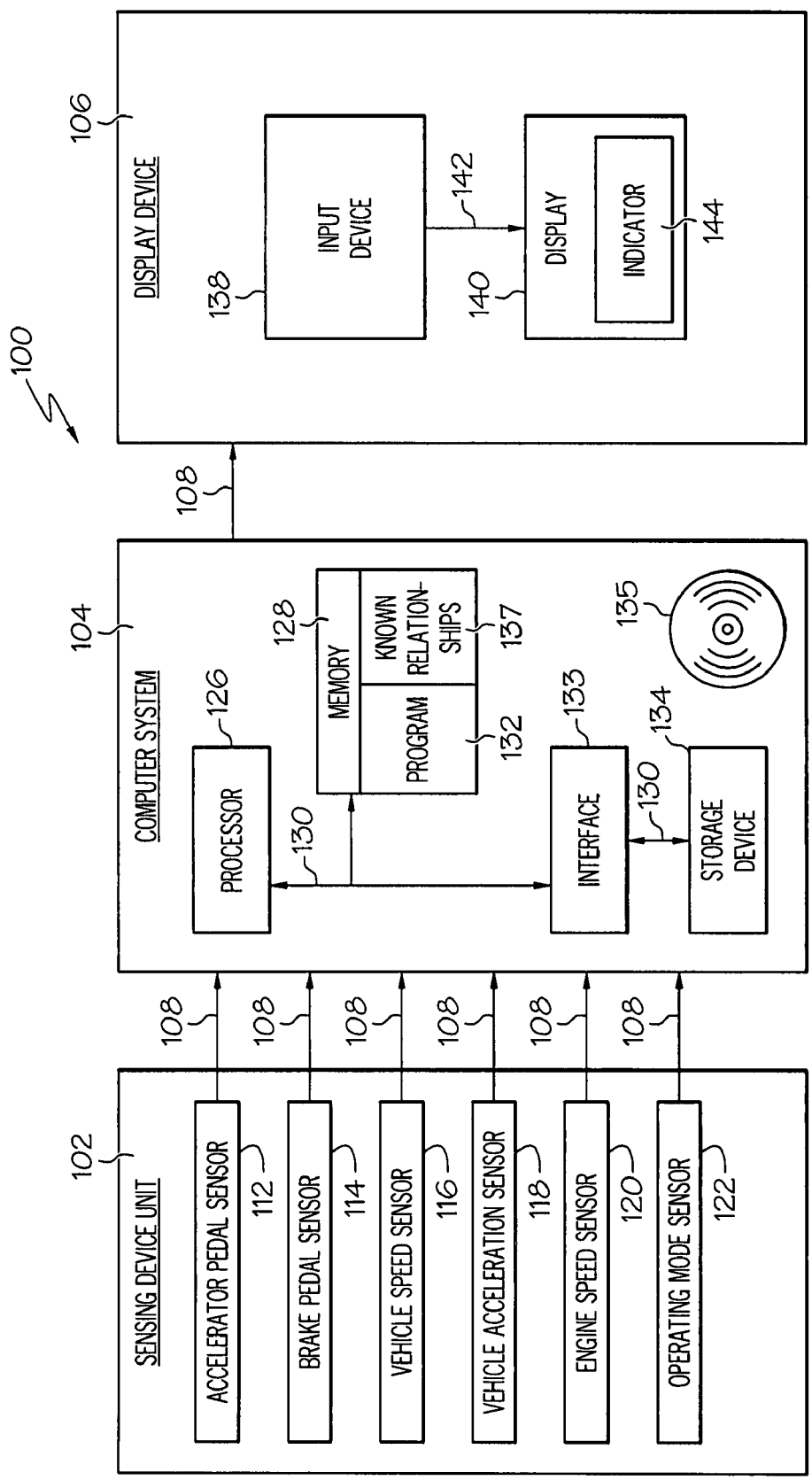
FIG. 1 is a functional block diagram showing a system for determining a driver efficiency value and an operating mode of a hybrid vehicle, in accordance with an exemplary embodiment of the present invention.

FIG. 1 is a functional block diagram showing a system 100 for determining and displaying a driver efficiency value in a hybrid vehicle, in accordance with an exemplary embodiment of the present invention. In the depicted embodiment, the system 100 includes a sensing device unit 102, a computer system 104, and a display system 106.

The sensing device unit 102 includes various sensors for measuring a plurality of hybrid vehicle parameters, for subsequent use by the computer system 104 in determining a driver efficiency value in the hybrid vehicle. Each of the hybrid vehicle parameters are influenced, at least in part, by an action of the driver, such as the driver's application of pressure against an accelerator pedal and/or a brake pedal of the hybrid vehicle. In the depicted embodiment, the sensing device unit 102 includes an accelerator pedal sensor 112, a brake pedal sensor 114, a vehicle speed sensor 116, a vehicle acceleration sensor 118, an engine speed sensor 120, and an operating mode sensor 122. In other embodiments, the sensing device unit 102 may include a different combination of these and/or other different types of sensors or similar devices.

The accelerator pedal sensor 112 senses if the driver is applying force to the accelerator pedal, for example by sensing when a driver's foot is in contact with the accelerator pedal. Additionally, the accelerator pedal sensor 112 senses changes in accelerator pedal position and/or force applied thereto. For example, the accelerator pedal sensor 112 measures changes in the accelerator pedal position and/or force applied against the accelerator pedal through driver actions, to at least facilitate a determination of a driver efficiency value, as set forth further below. Specifically, in the depicted embodiment, values sensed by the accelerator pedal sensor 112 are provided, via the vehicle bus 108, to the computer system 104 for processing. The accelerator pedal sensor 112 may include one or more sensors or similar devices, preferably coupled to the accelerator pedal of the hybrid vehicle.

The brake pedal sensor 114 senses if the driver is applying force to the brake pedal, for example by sensing when a driver's foot is in contact with the brake pedal. Additionally, the brake pedal sensor 114 senses changes in brake pedal position and/or force applied against the brake pedal based on driver actions, to at least facilitate a determination of a driver efficiency value as set forth further below. In one embodiment, the brake pedal sensor 114 senses braking pressure against the brake pedal, and includes one or more pedal travel sensors, pedal force sensors, and/or other sensors. For example, one or more pedal travel sensors may provide an indication of how far the brake pedal has traveled, which is also known as brake pedal travel, when the driver applies force to the brake pedal. In one exemplary embodiment, such brake pedal travel can be determined by how far a brake master cylinder input rod coupled to the brake pedal has moved. As another example, one or more brake pedal force sensors may determine how much force the driver is applying to the brake pedal. This is also known as brake pedal force. In one exemplary embodiment, such a brake pedal force sensor may include a hydraulic pressure emulator and/or a pressure transducer, and the brake pedal force can be determined by measuring hydraulic pressure in a master cylinder of a braking system.

Additionally, the brake pedal sensor 114 may, in concert with the accelerator pedal sensor 112, facilitate measurement of changes in the driver's application of the brake pedal and/or the accelerator pedal. For example, such changes may occur when the driver exerts significant pressure against the brake pedal and then the accelerator pedal, or vice versa, or both, or when the driver rapidly changes pressure against the accelerator pedal and/or the brake pedal. Such changes, or measures reflecting similar driver actions, can reflect less than optimal driver efficiency by the driver of the hybrid vehicle. In the depicted embodiment, values sensed by the brake pedal sensor 114 are provided, via the vehicle bus 108, to the computer system 104 for processing. The brake pedal sensor 114 may include one or more sensors or similar devices, preferably coupled to the brake pedal of the hybrid vehicle.

The vehicle speed sensor 116 measures a speed of the hybrid vehicle, for example as influenced, at least in part, by the driver's application of the accelerator pedal and/or the brake pedal. As described in greater detail further below, such vehicle speed values can be used in multiple ways to at least facilitate a determination of a driver efficiency value. In the depicted embodiment, values sensed by the vehicle speed sensor 116 are provided, via the vehicle bus 108, to the computer system 104 for processing. The vehicle speed sensor 116 may include one or more sensors or similar devices, for example coupled to one or more wheels of the hybrid vehicle or disposed inside the hybrid vehicle.

The vehicle acceleration sensor 118 measures an acceleration of the hybrid vehicle, for example as influenced, at least in part, by the driver's application of the accelerator pedal and/or the brake pedal. As described in greater detail further below, such vehicle acceleration values can be used to at least facilitate a determination of a driver efficiency value, for example when used to calculate a combined effect of vehicle speed and vehicle acceleration on the fuel efficiency of the hybrid vehicle. In the depicted embodiment, values sensed by the vehicle acceleration sensor 118 are similarly provided, via the vehicle bus 108, to the computer system 104 for processing. The vehicle acceleration sensor 118 may include one or more sensors or similar devices, for example accelerometers inside the hybrid vehicle.

The engine speed sensor 120 measures a speed of an engine of the hybrid vehicle, for example as influenced, at least in part, by the driver's application of the accelerator pedal and/or the brake pedal. As described in greater detail further below, such engine speed values can be used to at least facilitate a determination of a driver efficiency value. In the depicted embodiment, values sensed by the engine speed sensor 120 are provided, via the vehicle bus 108, to the computer system 104 for processing. The engine speed sensor 120 may include one or more sensors or similar devices, preferably coupled to an engine of the hybrid vehicle.

The operating mode sensor 122 facilitates a determination as to an operating mode of the hybrid vehicle in certain embodiments, for example as influenced, at least in part, by one or more actions of the driver. As described in greater detail further below, the value of the operating mode can be used, along with one or more vehicle parameters such as those measured by the other sensors of the sensing device unit 102, to at least facilitate a determination of a driver efficiency value. In the depicted embodiment, values sensed by the operating mode sensor 122 are provided, via the vehicle bus 108, to the computer system 104 for processing. The operating mode sensor 122 may include one or more sensors or similar devices, preferably coupled to an engine of the hybrid vehicle.

The computer system 104 is coupled to the sensing device unit 102. The computer system 104 receives data via the vehicle bus 108 from the various sensors of the sensing device unit 102. As described in more detail below, the computer system 104 uses values from the sensing device unit 102 to perform various calculations, comparisons, and determinations, such as those described further below in connection with FIG. 3, for example in determining a driver efficiency value, an operating mode of the hybrid vehicle, and relationships between such values. The computer system 104 uses such calculations, comparisons, and determinations in ultimately determining the driver efficiency value, and provides the driver efficiency value to the display system 106, in which the driver efficiency value is displayed in some format for the driver.

In the depicted embodiment, the computer system 104 includes a processor 126, a memory 128, a computer system bus 130, an interface 133, and a storage device 134. The processor 126 performs the computation and control functions of the computer system 104, and may comprise any type of processor or multiple processors, single integrated circuits such as a microprocessor, or any suitable number of integrated circuit devices and/or circuit boards working in cooperation to accomplish the functions of a processing unit. During operation, the processor 126 executes one or more programs 132 preferably stored within the memory 128 and, as such, controls the general operation of the computer system 104.

In one embodiment, the memory 128 stores a program or programs 132 that executes one or more embodiments of a driver efficiency determination process of the present invention, discussed in more detail below. The memory 128 can be any type of suitable memory. In addition, in a preferred embodiment, the memory 128 stores various tables, charts, functions, or other forms of known relationships 137 between the hybrid vehicle parameters and fuel efficiency of the hybrid vehicle, to assist in the determination of a driver efficiency value in the hybrid vehicle. The memory may include one or more of various types of dynamic random access memory (DRAM) such as SDRAM, the various types of static RAM (SRAM), and the various types of non-volatile memory (PROM, EPROM, and flash). It should be understood that the memory 128 may be a single type of memory component, or it may be composed of many different types of memory components. In addition, the memory 128 and the processor 126 may be distributed across several different computers that collectively comprise the computer system 104. For example, a portion of the memory 128 may reside on a computer within a particular apparatus or process, and another portion may reside on a remote computer.

The computer system bus 130 serves to transmit programs, data, status and other information or signals between the various components of the computer system 104. The computer system bus 130 can be any suitable physical or logical means of connecting computer systems and components. This includes, but is not limited to, direct hard-wired connections, fiber optics, infrared and wireless bus technologies.

The interface 133 allows communication to the computer system 104, for example from a system driver and/or another computer system, and can be implemented using any suitable method and apparatus. It can include one or more network interfaces to communicate with other systems or components, for example the sensing device unit 102 and the various sensors thereof, and/or the display system 106 and the input device 138 thereof, for example via the vehicle bus 108. The interface 133 may also include one or more network interfaces to communicate with technicians, and/or one or more storage interfaces to connect to storage apparatuses, such as the storage device 134.

The storage device 134 can be any suitable type of storage apparatus, including direct access storage devices such as hard disk drives, flash systems, floppy disk drives and optical disk drives. In one exemplary embodiment, the storage device 134 is a program product from which memory 128 can receive a program 132 that executes one or more embodiments of a driver efficiency determination process of the present invention. As shown in FIG. 1, the storage device 134 can comprise a disk drive device that uses disks 135 to store data. As one exemplary implementation, the computer system 104 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 135), and transmission media such as digital and analog communication links. It will similarly be appreciated that the computer system 104 may also otherwise differ from the embodiment depicted in FIG. 1, for example in that the computer system 104 may be coupled to or may otherwise utilize one or more remote computer systems and/or other control systems.

The display system 106 is coupled to the processor 126 of the computer system 104 via the vehicle bus 108. The display system 106 receives the driver efficiency value and operating mode information therefrom via the vehicle bus 108, and displays the driver efficiency value and the operating mode for the driver, preferably while the driver is operating the hybrid vehicle. As depicted in FIG. 1, the display system 106 includes an input device 138 and a display 140. The input device 138 is coupled to the processor 126 of the computer system 104, and is configured to receive the driver efficiency value and operating mode information therefrom. The display 140 is coupled to the input device 138, and receives data representative of the driver efficiency value and the operating mode therefrom, for example via a connection 142. The display 140 includes an indicator 144 that is configured to move between a plurality of positions based, at least in part, on the driver efficiency value and the operating mode, as described in greater detail below in connection with FIG. 2.

Figure 2:
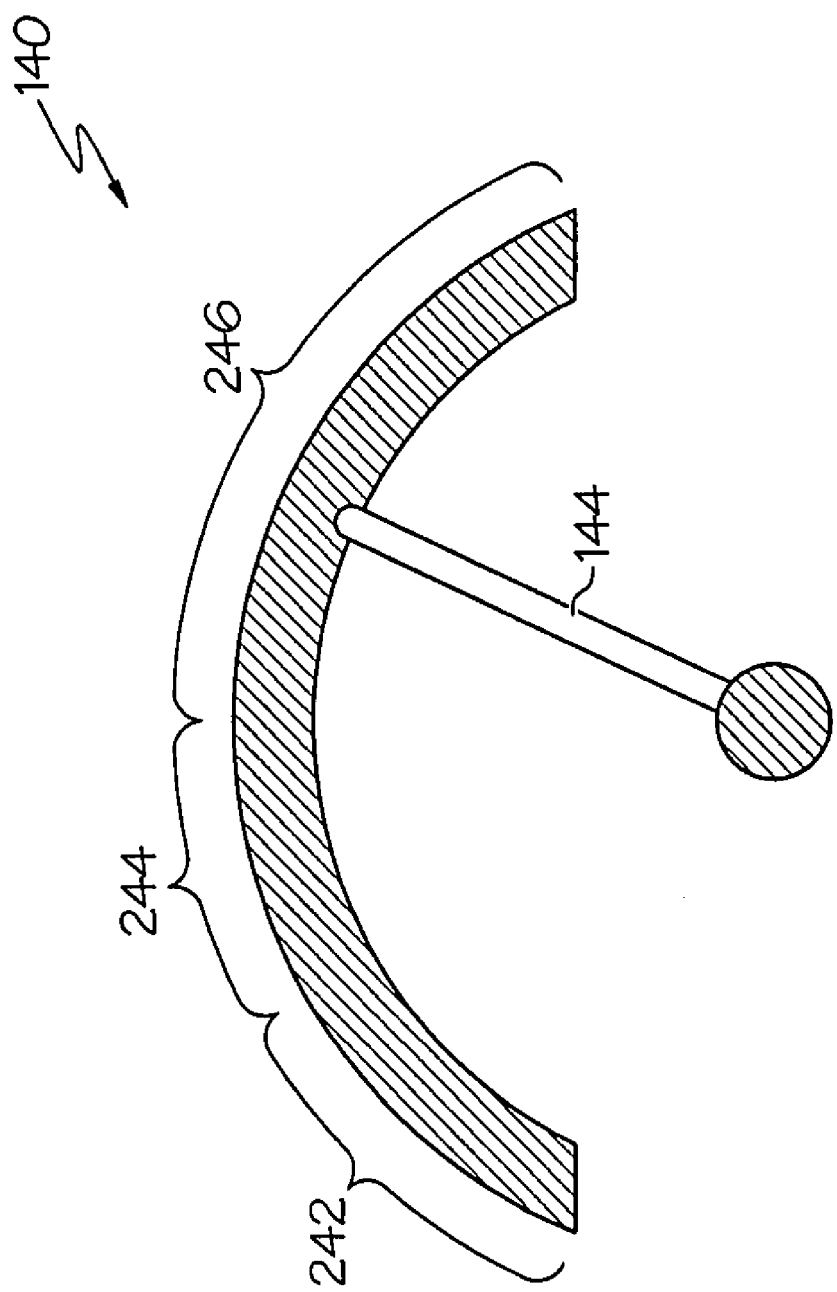
FIG. 2 is a front view of a display for displaying a value of driver efficiency and an operating mode of a hybrid vehicle, and that can be used in connection with the system of FIG. 1, in accordance with an exemplary embodiment of the present invention.

FIG. 2 is a front view of the display 140 in accordance with an exemplary embodiment of the present invention. As depicted in FIG. 2, in a preferred embodiment the indicator 144 of the display 140 comprises a gauge 144 that is movable within and between a first range 242, a second range 244, and a third range 246 of positions, depending on the driver efficiency value and the operating mode of the hybrid vehicle.

The gauge 144 moves within the first range 242 of positions when the operating mode indicates that the hybrid vehicle is being propelled by battery power. The gauge 144 moves to the left within this first range 242 as the driving becomes more efficient within this range. Conversely, the gauge 144 moves to the right within this first range 242 as the driving becomes less efficient within this range.

The gauge 144 moves within the second range 244 of positions when the operating mode indicates that the both of the following conditions are in effect; namely, that the hybrid vehicle is running and the hybrid vehicle is not fueling. Specifically, this refers to conditions in which an engine of the hybrid vehicle is spinning, but no fuel is supplied to the engine and, consequently, the engine is not generating torque via combustion. The gauge 144 moves to the left within this second range 244 as the driving becomes more efficient within this range. Conversely, the gauge 144 moves to the right within this second range 244 as the driving becomes less efficient within this range.

The gauge 144 moves within the third range 246 of positions when both of the following conditions are satisfied; namely, that the hybrid vehicle engine is running and the hybrid vehicle is fueling. Specifically, this refers to conditions in which an engine of the hybrid vehicle is spinning, and fuel is supplied to the engine and, therefore, the engine is generating torque via combustion. The gauge 144 is depicted as being within this third range 246 in FIG. 2. The gauge 144 moves to the left within this third range 246 as the driving becomes more efficient within this range. Conversely, the gauge 144 moves to the right within this third range 246 as the driving becomes less efficient within this range.

Accordingly, the display 140 provides the driver with information as to how efficient he or she is operating the hybrid vehicle, and also regarding the operating mode of the hybrid vehicle. The driver can quickly ascertain the operating mode by viewing which of the three ranges of positions the gauge 144 is currently located within. In addition, the driver can quickly ascertain how efficiently he or she is operating the hybrid vehicle by viewing how far to the left or right the gauge 144 currently appears within a particular range of the display 140 at any particular point in time.

Figure 3:
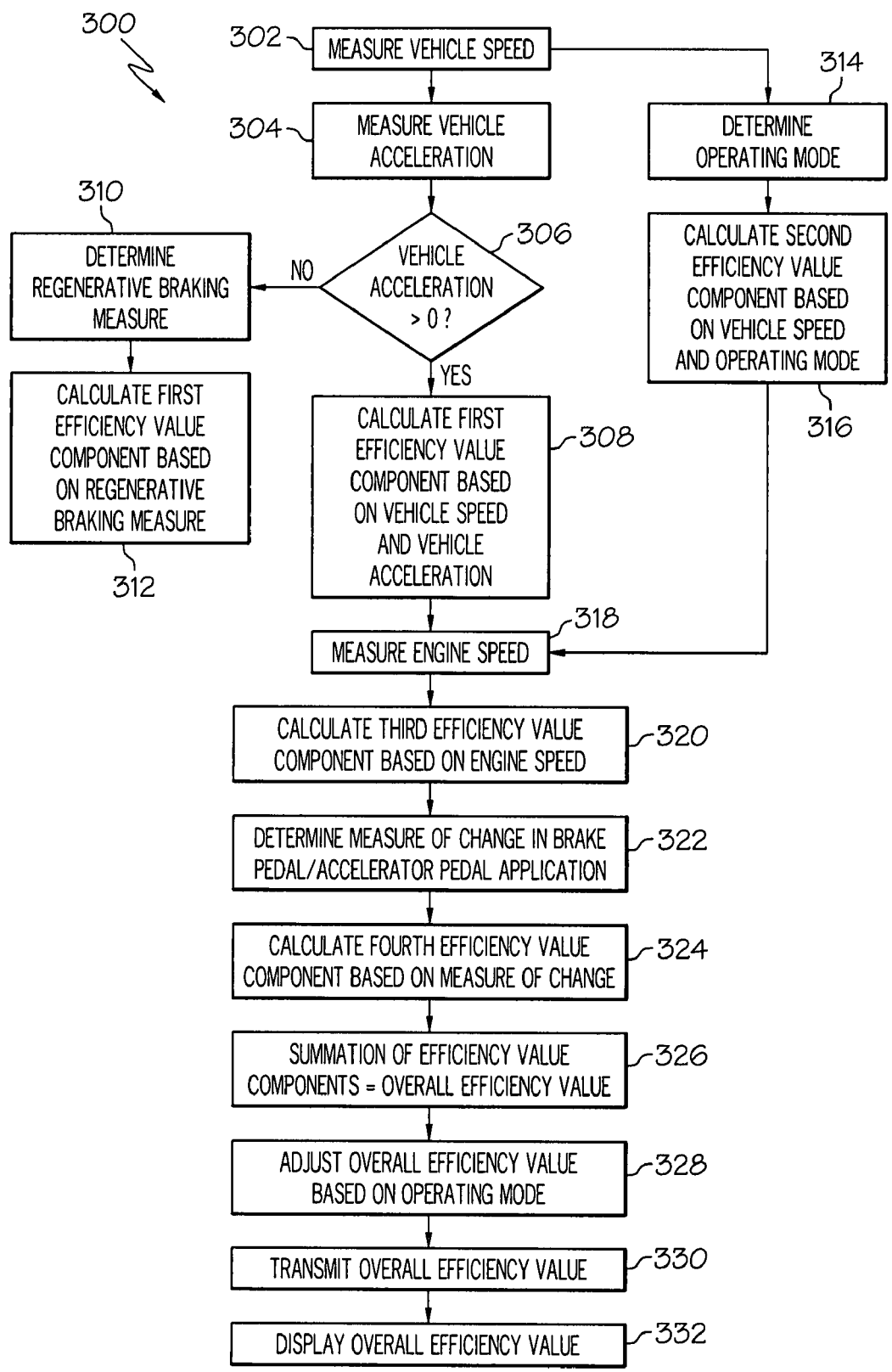
FIG. 3 is a flowchart showing a process for determining a driver efficiency value and an operating mode of a hybrid vehicle, and that can be used in connection with the system of FIG. 1 and the display of FIG. 2, in accordance with an exemplary embodiment of the present invention.

FIG. 3 is a flowchart of an exemplary embodiment of a driver efficiency and operating mode determination and display process 300 for determining a driver efficiency value and an operating mode of a hybrid vehicle. As shown in FIG. 3, the driver efficiency and operating mode determination begins with measuring a vehicle speed (step 302). In a preferred embodiment, the vehicle speed is determined at least in part by the vehicle speed sensor 116 of FIG. 1. In addition, a vehicle acceleration is measured (step 304). In a preferred embodiment, the vehicle acceleration is measured at least in part by the vehicle acceleration sensor 118 of FIG. 1.

Next, a determination is made as to whether the vehicle acceleration is greater than zero (step 306). In a preferred embodiment, this determination is made at least in part by the processor 126 of the computer system 104 of FIG. 1 based on a vehicle acceleration measure sensed by the vehicle acceleration sensor 118 of FIG. 1 in step 304 above.

If it is determined in step 306 that the vehicle acceleration is greater than zero, then a first efficiency value component is calculated based, at least in part, on the vehicle speed and the vehicle acceleration (step 308). In one embodiment, the first efficiency value component is calculated using the vehicle speed and vehicle acceleration values along with a known relationship correlating vehicle speed and vehicle acceleration with fuel efficiency of the hybrid vehicle. In a preferred embodiment, the first efficiency value component represents a base score efficiency value component that provides larger efficiency value components for smaller accelerations as vehicle speed increases.

Figure 4:
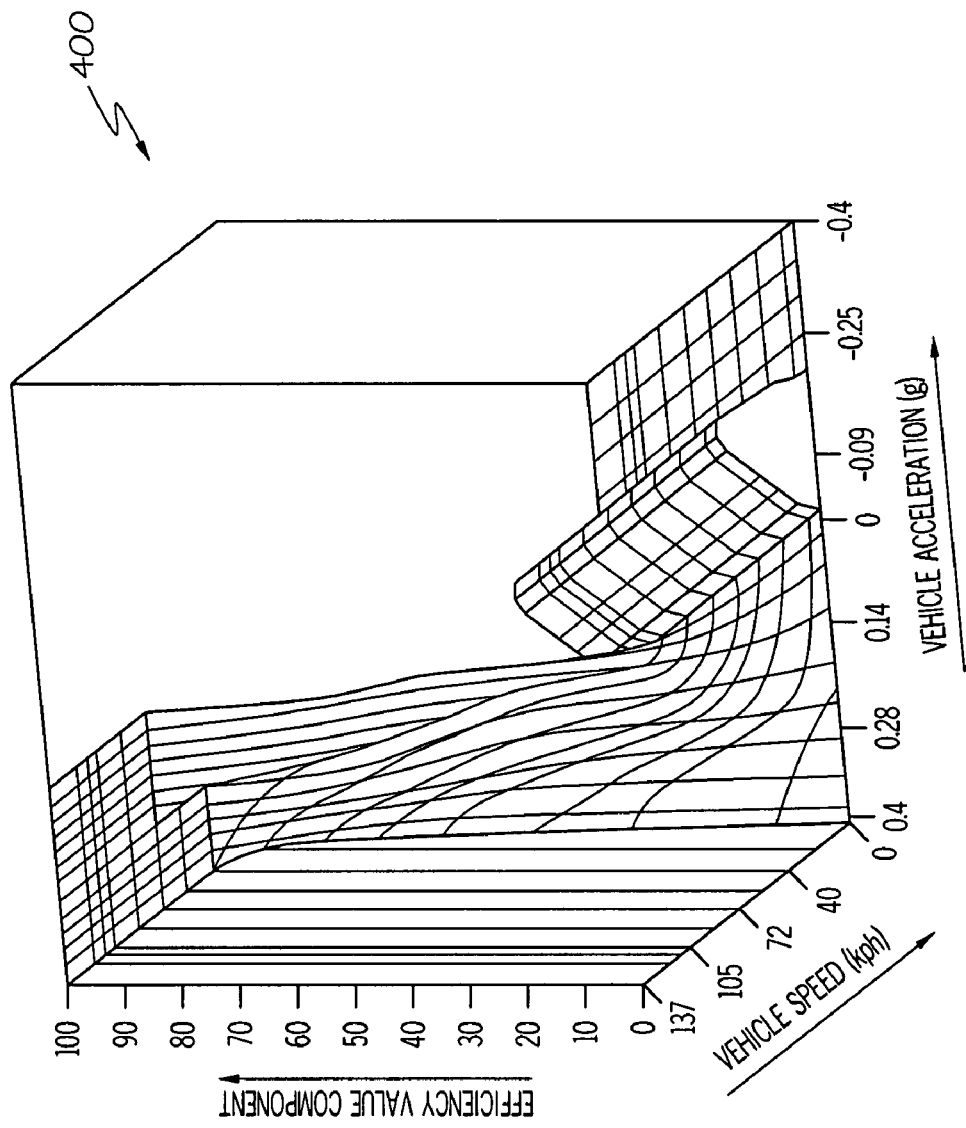
FIG. 4 is a graph showing a relationship between values of vehicle speed and vehicle acceleration on fuel efficiency of a hybrid vehicle when the hybrid vehicle is accelerating, as reflected in a driver efficiency value component, and that can be used in connection with the process of FIG. 3, in accordance with an exemplary embodiment of the present invention.

FIG. 4 depicts an exemplary embodiment of such a known relationship, in the form of a first efficiency value component chart 400. As shown in FIG. 4, in this embodiment vehicle acceleration is represented along the x-axis and is measured in units of standard acceleration of gravity (g). Vehicle speed is represented along the y-axis and is measured in kilometers per hour (kph). The first efficiency value component is represented along the z-axis, and is measured in units between zero and one hundred. The first efficiency value component is thus calculated based on the combined effect of current measures of vehicle acceleration and vehicle speed on the fuel efficiency of the hybrid vehicle. While a first efficiency value component chart 400 is shown in FIG. 4, various other different types of known relationships, such as functions of the variables or tables correlating the variables, may also be used. The first efficiency value component chart 400, and/or any other types of known relationships 137 pertaining to these variables, are stored in the memory 128 of FIG. 1, and the first efficiency value component is calculated by the processor 126, in a preferred embodiment.

Conversely, and with reference again to FIG. 3, if it is determined in step 306 that the vehicle acceleration is less than or equal to zero, then the first efficiency value component is instead calculated based on a regenerative braking measure (steps 310 and 312, described below). Specifically, first a regenerative braking measure is determined (step 310). In one embodiment, the regenerative braking measure represents a value of potential conversion of kinetic energy to electrical energy, and thereby potential fuel and/or energy savings, in the hybrid vehicle. In one preferred embodiment, the regenerative braking measure is determined at least in part by the processor 126 of the computer system 104 of FIG. 1, using values obtained from the brake pedal sensor 114 and/or from other sensors of the sensing device unit 102 of FIG. 1. The first efficiency component value is then calculated based, at least in part, on the regenerative braking measure (step 312), and preferably also based on a known relationship between such a regenerative braking measure on the fuel efficiency of the hybrid vehicle.

Accordingly, the first efficiency value component is calculated in one of two alternative manners, depending on whether the hybrid vehicle is accelerating (the first alternative, in step 308) or decelerating (the second alternative, in steps 310 and 312). In either case, in a preferred embodiment, the first component efficiency value is calculated by the processor 126 of the computer system 104 of FIG. 1, using a known relationship 137 stored in the memory 128.

Meanwhile, an operating mode of the hybrid vehicle is determined (step 314). In a preferred embodiment, the operating mode is determined by the operating mode sensor 122 and/or the processor 126 of FIG. 1, and represents one of the three possible operating modes: (i) whether the hybrid vehicle is currently being propelled by battery power, (ii) whether the hybrid vehicle's engine is running, and the hybrid vehicle is not fueling (i.e., the engine is spinning, but no fuel is supplied to the engine and, consequently, the engine is not generating torque via combustion), and (iii) whether the hybrid vehicle's engine is running, and the hybrid vehicle is fueling (i.e., the engine is spinning and fuel is supplied to the engine and, consequently, the engine is generating torque via combustion). In certain embodiments, different combinations of these and/or other operating modes may be used. In addition, in certain embodiment, the operating mode may be determined by the processor 126 of FIG. 1 alone, or by the operating mode sensor 122 alone, or by one or more other devices.

A second efficiency value component is then calculated, based on the vehicle speed and the operating mode (step 316). In one embodiment, the second efficiency value component is calculated using the vehicle speed and the operating mode along with a known relationship correlating vehicle speed and fuel efficiency, and also based, at least in part, on the operating mode of the hybrid vehicle. In one embodiment, the second efficiency value component represents a greater inefficiency in response to larger amounts of aerodynamic drag as vehicle speed increases in either operating mode.

Figure 5:
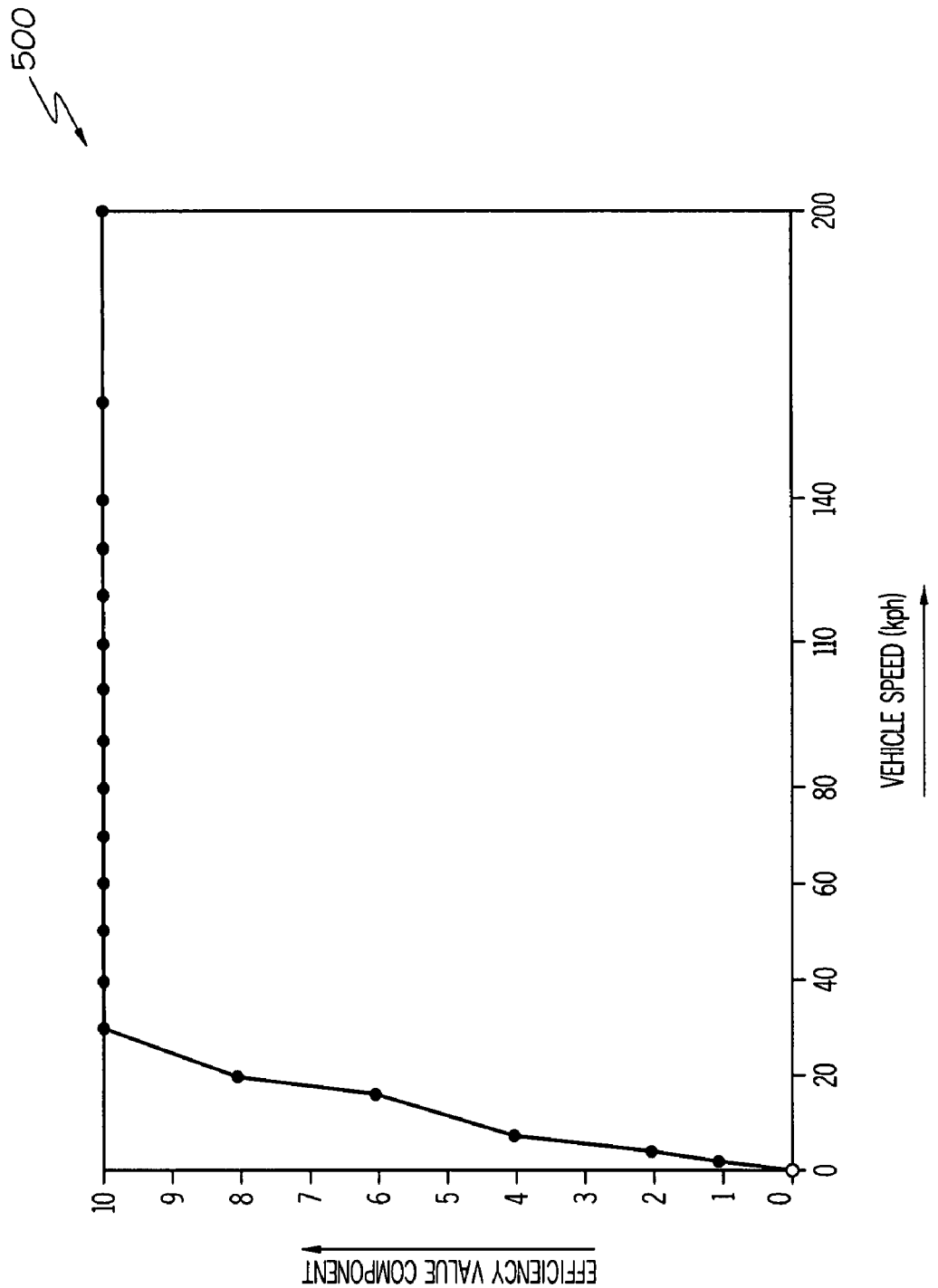
FIG. 5 is a graph showing a relationship between values of vehicle speed on fuel efficiency of a hybrid vehicle in accordance with a first operating mode of the hybrid vehicle, in which the hybrid vehicle is operated using battery propulsion, as reflected in a driver efficiency value component, and that can be used in connection with the process of FIG. 3, in accordance with an exemplary embodiment of the present invention.

FIG. 5 depicts an exemplary embodiment of such a known relationship, in the form of a second efficiency value component chart 500 for use when the hybrid vehicle is being propelled by battery power. As shown in FIG. 5, in this embodiment vehicle speed is represented along the x-axis and is measured in kilometers per hour (kph). The second efficiency value component is represented along the y-axis, and is measured in units between zero and seventy for vehicle speeds in the range of zero to two hundred kilometers per hour, as shown in FIG. 5. In other embodiments, and/or for vehicle speeds above 200 kilometers per hour, the second efficiency value component may include higher values, for example up to a possible upper limit of one hundred in one preferred embodiment.

Figure 6:
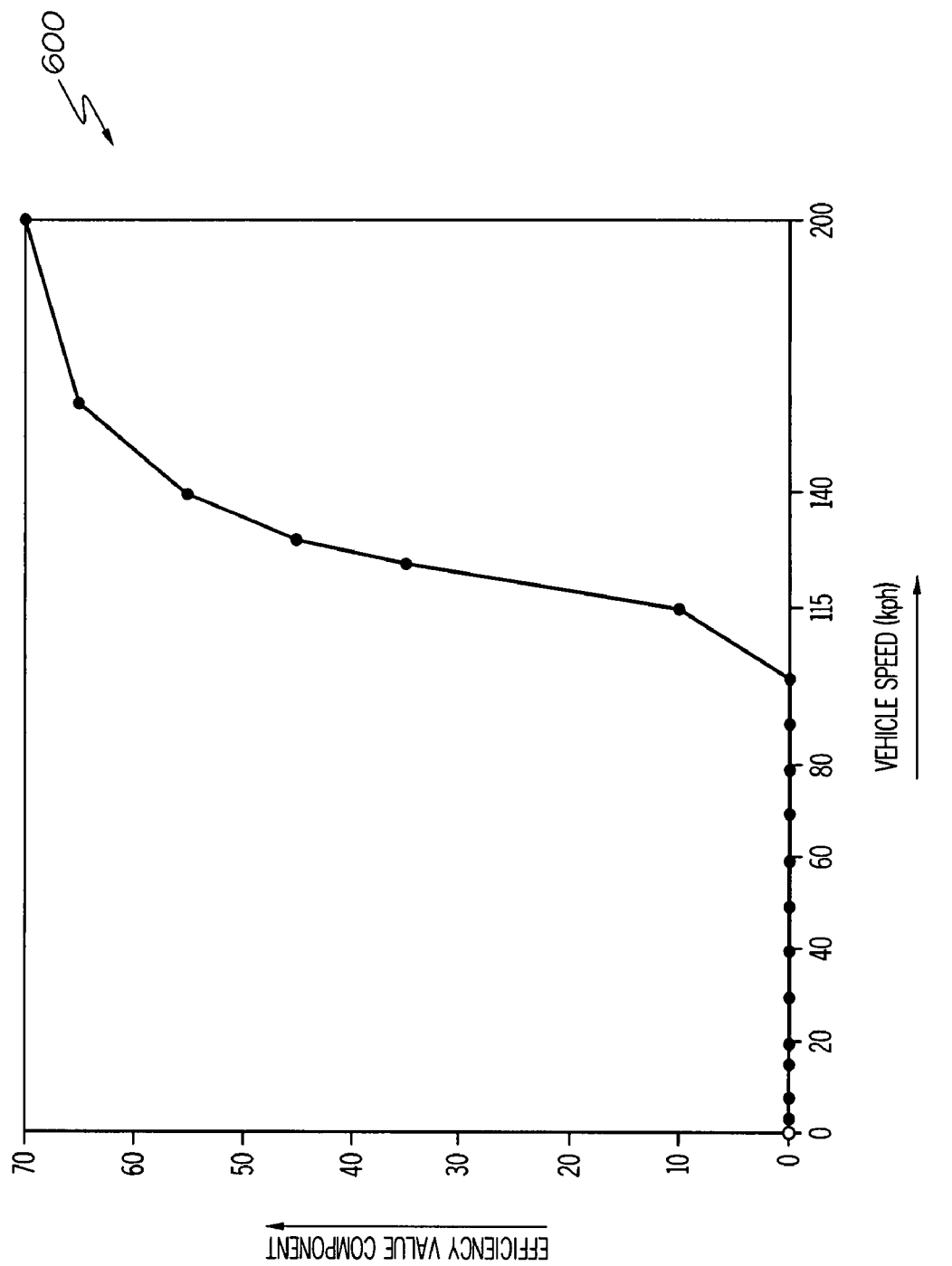
FIG. 6 is a graph showing a relationship between values of vehicle speed on fuel efficiency of a hybrid vehicle in accordance with a second operating mode of the hybrid vehicle, in which the hybrid vehicle is operated using gas or electric propulsion, as reflected in a driver efficiency value component, and that can be used in connection with the process of FIG. 3, in accordance with an exemplary embodiment of the present invention.

FIG. 6 depicts an exemplary embodiment of another such known relationship, in the form of an alternative second efficiency value component chart 600 for use when the hybrid vehicle is being propelled by gas or electric power. As shown in FIG. 6, in this embodiment vehicle speed is also represented along the x-axis and is measured in kilometers per hour (kph). The second efficiency value component is represented along the y-axis, and is measured in units between zero and seventy for vehicle speeds in the range of zero to two hundred kilometers per hour, as shown in FIG. 6. In other embodiments, and/or for vehicle speeds above 200 kilometers per hour, the second efficiency value component may include higher values, for example up to a possible upper limit of one hundred in one preferred embodiment.

The second efficiency value component is thus calculated based on the effect of current vehicle speed on the fuel efficiency of the hybrid vehicle, using the second efficiency value component chart 500 of FIG. 5 if the hybrid vehicle is being propelled by battery power, or, alternatively, using the alternative second efficiency value component chart 600 of FIG. 6 if the hybrid vehicle is being propelled by gas or electric power. While a second efficiency value component chart 500 and an alternative second efficiency value chart 600 are shown in FIGS. 5 and 6, respectively, various other different types of known relationships, such as functions of the variables or tables correlating the variables, may also be used. The second efficiency value component chart 500, the alternative second efficiency value component chart 600, and/or any other types of known relationships 137 relating these variables, are stored in the memory 128 of FIG. 1 in a preferred embodiment. In addition, the second efficiency value component is calculated by the processor 126 of FIG. 1 in a preferred embodiment. It will be appreciated that, in certain embodiments, steps 304 through 312 and steps 314 through 316, as well as various other steps of the driver efficiency and operating mode determination and display process 300, may be performed, in whole or in part, simultaneously or in an order different from that depicted in FIG. 3, regardless of the order presented in FIG. 3 or discussed herein.

Next, and with reference again to FIG. 3, an engine speed is measured (step 318). In a preferred embodiment, the engine speed is measured at least in part by the engine speed sensor 120 of FIG. 1. A third efficiency value component is then calculated (step 320), based on the engine speed. In one embodiment, the third efficiency value component is calculated using the engine speed along with a known relationship correlating engine speed and fuel efficiency of the hybrid vehicle. For example, in one embodiment, the third efficiency value component may be assessed if the engine speed exceeds one thousand nine hundred revolutions per minute (1,900 rpm). Various other values and thresholds may be used in other embodiments. In another embodiment, the third efficiency value may only be assigned if one or more other conditions are satisfied, for example only if the hybrid vehicle is accelerating.

Figure 7:
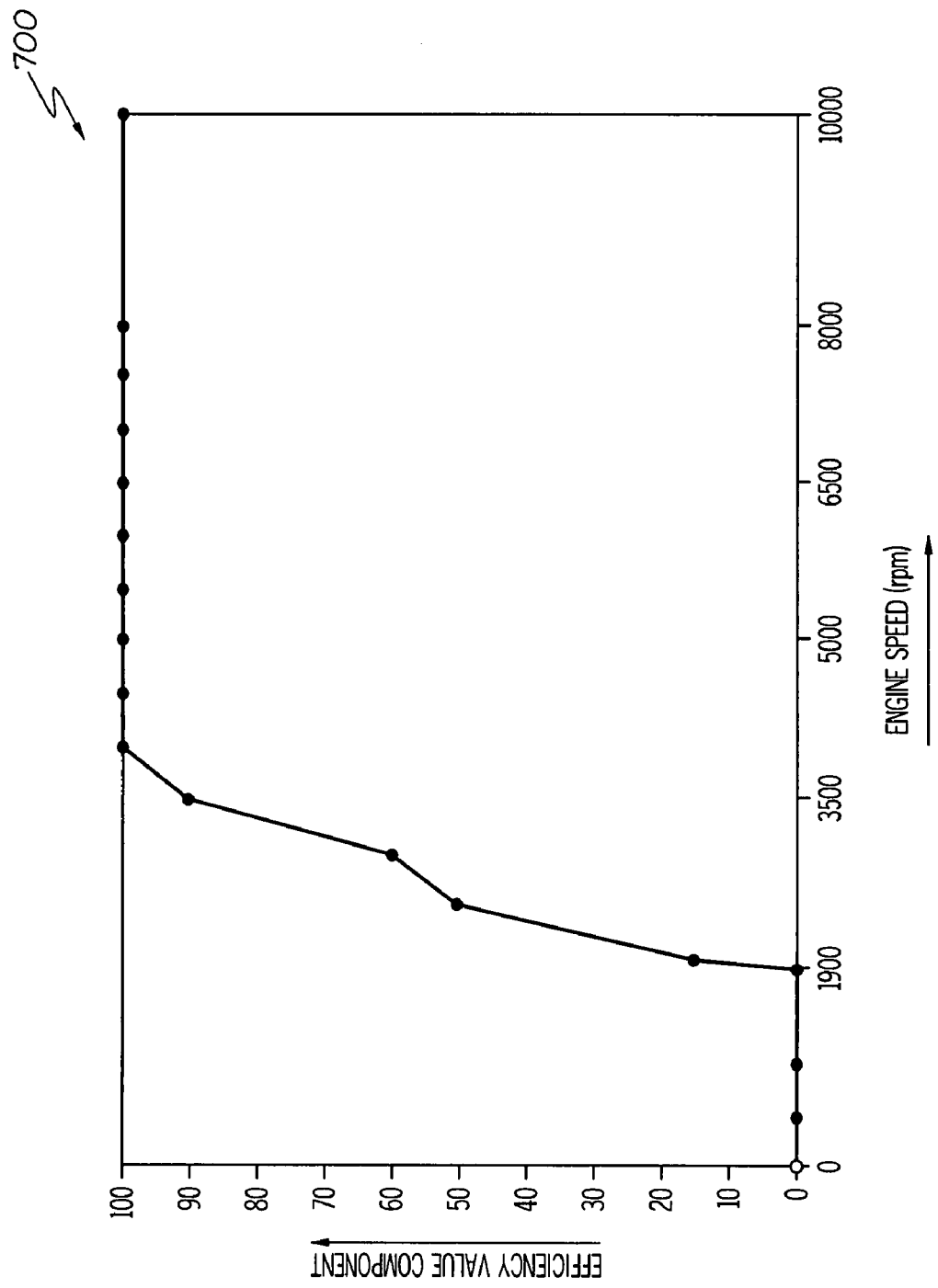
FIG. 7 is a graph showing a relationship between values of engine speed on fuel efficiency of a hybrid vehicle, as reflected in a driver efficiency value component, and that can be used in connection with the process of FIG. 3, in accordance with an exemplary embodiment of the present invention.

FIG. 7 depicts an exemplary embodiment of such a known relationship, in the form of a third efficiency value component chart 700. As shown in FIG. 7, in this embodiment, the engine speed is represented along the x-axis and is measured in revolutions per minute (rpm). The third efficiency value component is represented along the y-axis, and is measured in units between zero and one hundred. The third efficiency value component is thus calculated based on the effect of current engine speed on the fuel efficiency of the hybrid vehicle. While a third efficiency value component chart 700 is shown in FIG. 7, various other different types of known relationships, such as functions of the variables or tables correlating the variables, may also be used. The third efficiency value component chart 700, and/or any other types of known relationships 137 relating these variables, are stored in the memory 128 of FIG. 1 in a preferred embodiment. In addition, the third efficiency value is calculated by the processor 126 of FIG. 1 in a preferred embodiment.

Next, and with reference again to FIG. 3, one or more values are measured as to changes in one or more applications of an accelerator pedal or a brake pedal, or both, of a hybrid vehicle (step 322). In a preferred embodiment, these one or more values are measured with information determined by the accelerator pedal sensor 112 and/or the brake pedal sensor 114 of FIG. 1. For example, such a value may reflect jerky or "stop and go" driving maneuvers by the driver. This may include significant changes in accelerator pedal position and/or brake pedal position over a relatively short amount of time, such as when the driver (i) engages and disengages the accelerator pedal during a relatively short period of time, (ii) engages and disengages the brake pedal over a relatively short period of time, (iii) rapidly changes a magnitude of pressure applied to the accelerator pedal and/or the brake pedal over a relatively short period of time, and/or (iv) sequentially engages the accelerator pedal and the brake pedal with at least a certain amount of pressure over a relatively short amount of time. This may also include other measures of driver activity relating to changes in application of the accelerator pedal, the brake pedal, or both, thereby potentially resulting in inefficient driving.

A fourth efficiency value component is then calculated, based on the one or more values as to changes in one or more applications of an accelerator pedal or a brake pedal, or both (step 324). In one embodiment, the fourth efficiency value component is calculated using one or more such values, along with a known relationship correlating such one or more values on the fuel efficiency of the hybrid vehicle. For example, in one embodiment, the fourth efficiency value component represents an accelerator pedal motion efficiency value component, and is assessed when the driver rapidly changes the accelerator pedal position.

Figure 8:
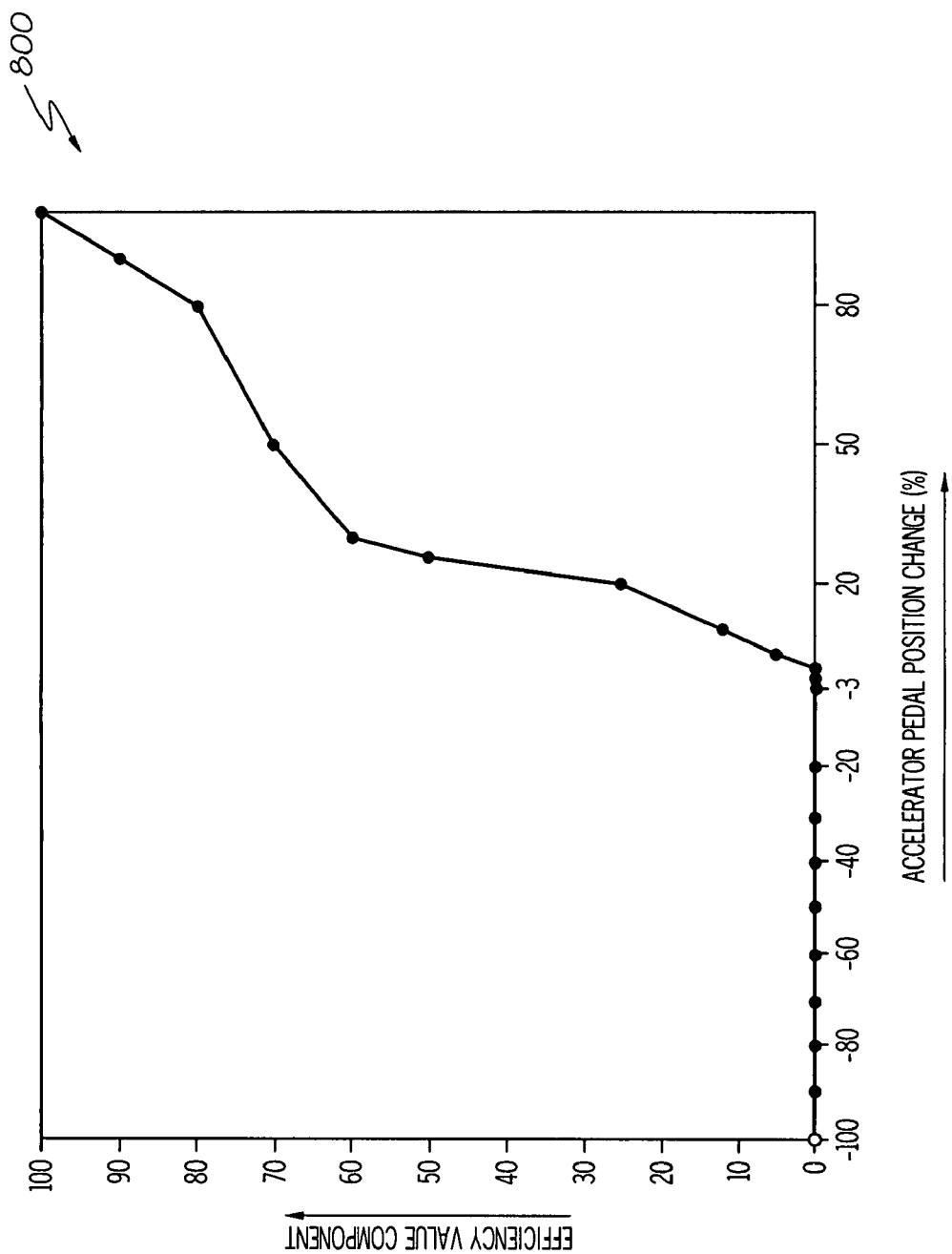
FIG. 8 is a graph showing a relationship between values of changes in accelerator pedal position on fuel efficiency of a hybrid vehicle, as reflected in a driver efficiency value component, and that can be used in connection with the process of FIG. 3, in accordance with an exemplary embodiment of the present invention.

FIG. 8 depicts an exemplary embodiment of such a known relationship, in the form of a fourth efficiency value component chart 800. As shown in FIG. 8, in one embodiment, a measure of a change in position of the accelerator pedal is represented along the x-axis and is measured as a percentage change (%). The fourth efficiency value component is represented along the y-axis, and is measured in units between zero and one hundred. In this embodiment, the fourth efficiency value component is thus calculated based on the effect of the percentage change in accelerator pedal position on the fuel efficiency of the hybrid vehicle.

While a fourth efficiency value component chart 800 is shown in FIG. 8, various other different types of known relationships, such as functions of the variables or tables correlating the variables, may also be used. Additionally, the calculation of the fourth efficiency value component may include one or more other types of measures of changes in the application of the accelerator pedal or the brake pedal, or both, such as those discussed above. The fourth efficiency value component chart 800, and/or any other types of known relationships 137 relating these variables, are stored in the memory 128 of FIG. 1 in a preferred embodiment.

Returning again to FIG. 3, the first, second, third, and fourth efficiency value components are then added together to calculate an overall efficiency value of the hybrid vehicle (step 326). Next, in step 328, the overall efficiency value is adjusted, based, at least in part, on the operating mode of the hybrid vehicle. For example, in one preferred embodiment, the overall efficiency value is scaled so that it fits into a particular range of values corresponding to the first, second, or third ranges 242, 244, or 246 of positions of the indicator 144 of the display of FIGS. 1 and 2. For example, if the operating mode indicates that the hybrid vehicle is being propelled by battery power, then the overall efficiency value is scaled to fit within a range of values represented by the first range 242 of FIG. 2. Similarly, if the operating mode indicates that the engine is running and the hybrid vehicle is not fueling, then the overall efficiency value is scaled to fit within a range of values represented by the second range 244 of FIG. 2. Likewise, if the operating mode indicates that the engine is running and the hybrid vehicle is fueling, then the overall efficiency value is scaled to fit within a range of values represented by the third range 246 of FIG. 2.

Next, the overall efficiency value is transmitted (step 330), for ultimate display for the driver. In one preferred embodiment, the overall efficiency value is transmitted by the processor 126 of the computer system 104 to the input device 138 of the display system 106 of FIG. 1. The overall efficiency value is then displayed for the driver (step 332). In one preferred embodiment, the overall efficiency value is displayed by the indicator 144 of the display 140 of FIGS. 1 and 2. Specifically, the overall efficiency value is preferably displayed by the gauge 144 of the display 140 as depicted in FIG. 2 within one of three ranges, such as the first range 242, the second range 244, or the third range 246, depending on the current operating mode of the hybrid vehicle, while the driver is operating the hybrid vehicle.

Accordingly, a system is provided for determining and displaying a driver efficiency value and an operating mode of a hybrid vehicle. A method is also provided for determining and displaying a driver efficiency value and an operating mode of a hybrid vehicle. The system and method allow the driver to easily ascertain how efficiently the driver is operating the hybrid vehicle along with an operating mode of the hybrid vehicle, while incorporating a relationship therebetween while the driver is operating the hybrid vehicle, so that the driver can make appropriate adjustments to improve the efficiency of the driver's operation of the hybrid vehicle. Additionally, this may also help improve hybrid vehicle emissions through such driver adjustments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for providing a driver efficiency in a hybrid vehicle having an engine, the method comprising the steps of:
    measuring a hybrid vehicle parameter that is influenced, at least in part, by an action taken by a driver;
    determining an operating mode of the hybrid vehicle;
    calculating the driver efficiency based, at least in part, on the hybrid vehicle parameter and the operating mode of the hybrid vehicle, the driver efficiency comprising a measure of an impact of the action on a fuel efficiency of the hybrid vehicle; and
    displaying the driver efficiency via movement of a gauge between and within a plurality of ranges of positions, the plurality of ranges of positions comprising:
        a first range of positions indicating that the hybrid vehicle is being propelled by battery power with
        a second range of positions indicating that the engine is running and the hybrid vehicle is not fueling; and
        a third range of positions indicating that the engine is running and the hybrid vehicle is fueling.

2. The method of claim 1, further comprising the step of:
    measuring a plurality of additional hybrid vehicle parameters that are influenced, at least in part, by the action or an additional action taken by the driver, or both;
    wherein the step of calculating the driver efficiency comprises the steps of:
        determining a plurality of efficiency values, each efficiency value comprising an effect of the hybrid vehicle parameter or one of the plurality of additional hybrid vehicle parameters, or both, on the fuel efficiency of the hybrid vehicle; and
        aggregating the plurality of efficiency values together, to calculate the driver efficiency.

3. The method of claim 2, wherein the step of determining the plurality of efficiency values comprises the steps of:
    determining whether the hybrid vehicle is accelerating or decelerating;
    if the hybrid vehicle is accelerating:
        measuring a vehicle speed;
        measuring a vehicle acceleration; and
        calculating an efficiency value, based, at least in part, on the vehicle speed, the vehicle acceleration, and a known relationship correlating vehicle speed and vehicle acceleration to fuel efficiency, if the hybrid vehicle is accelerating; and
    if the hybrid vehicle is decelerating:

calculating the efficiency value based, at least in part, on an amount of regenerative braking that the hybrid vehicle is capable of executing under current operating conditions.

4. The method of claim 3, wherein the step of determining the plurality of efficiency values further comprises the steps of:
calculating a second efficiency value based, at least in part, on the vehicle speed and a first known relationship correlating vehicle speed to fuel efficiency, if the operating mode indicates that the hybrid vehicle is being propelled by battery power; and
calculating the second efficiency value based, at least in part, on the vehicle speed and a second known relationship correlating vehicle speed to fuel efficiency, if the operating mode indicates that the hybrid vehicle is being propelled other than by battery power.

5. The method of claim 4, wherein the step of determining the plurality of efficiency values further comprises the steps of:
measuring an engine speed;
calculating a third efficiency value, based, at least in part, on the engine speed and a known relationship correlating engine speed to fuel efficiency;
determining a measure of change in application of a brake pedal, an accelerator pedal, or both; and
calculating a fourth efficiency value, based, at least in part, on the measure of change and a known relationship correlating such measure of change to fuel efficiency.

6. The method of claim 5, further comprising the step of:
adjusting the efficiency value depending on the operating mode of the hybrid vehicle.

7. A display device for a hybrid vehicle having an engine, the display device comprising:
an input device configured to receive driver efficiency, the driver efficiency comprising a measure of an impact of an action taken by a driver of the hybrid vehicle on a fuel efficiency of the hybrid vehicle, the driver efficiency also comprising an indication of an operating mode of the hybrid vehicle; and
a display coupled to the input device, the display comprising an indicator configured to move between a plurality of positions based, at least in part, on the driver efficiency, wherein the indicator comprises a gauge movable between and within a plurality of ranges of positions, the plurality of ranges of positions comprising:
a first range of positions indicating that the hybrid vehicle is being propelled by battery power;
a second range of positions indicating that the engine is running and the hybrid vehicle is not fueling; and
a third range of positions indicating that the engine is running and the hybrid vehicle is fueling.

8. A system for displaying a driver efficiency for a hybrid vehicle having an engine, the system comprising:
a sensing unit configured to at least facilitate measuring a hybrid vehicle parameter that is influenced, at least in part, by an action taken by a driver;
a processor coupled to the sensing unit and configured to at least facilitate:
determining an operating mode of the hybrid vehicle; and
calculating the driver efficiency based, at least in part, on the hybrid vehicle parameter and the operating mode of the hybrid vehicle, the driver efficiency comprising a measure of an impact of the action on a fuel efficiency of the hybrid vehicle; and a display device coupled to the processor, the display device comprising:
an input device coupled to the processor and configured to receive the driver efficiency therefrom; and
a display coupled to the input device, the display comprising an indicator configured to move between a plurality of positions based, at least in part, on the driver efficiency, wherein the indicator comprises a gauge movable between and within a plurality of ranges of positions, the plurality of ranges of positions comprising:
a first range of positions indicating that the hybrid vehicle is being propelled by battery power;
a second range of positions indicating that the engine is running and the hybrid vehicle is not fueling; and
a third range of positions indicating that the engine is running and the hybrid vehicle is fueling.

9. The system of claim 8, wherein:
the sensing unit is further configured to measure a plurality of additional hybrid vehicle parameters that are influenced, at least in part, by the action or an additional action of the driver, or both; and
the processor is further configured to at least facilitate:
determining a plurality of efficiency values, each efficiency value comprising an effect of the hybrid vehicle parameter or one of the plurality of additional hybrid vehicle parameters, or both, on the fuel efficiency of the hybrid vehicle; and
aggregating the plurality of efficiency values together, to calculate the driver efficiency.

10. The system of claim 9, wherein the processor is configured to at least facilitate:
determining whether the hybrid vehicle is accelerating or decelerating;
if the hybrid vehicle is accelerating:
measuring a vehicle speed;
measuring a vehicle acceleration; and
calculating an efficiency value based, at least in part, on the vehicle speed, the vehicle acceleration, and a known relationship correlating vehicle speed and vehicle acceleration to fuel efficiency, if the hybrid vehicle is accelerating; and
if the hybrid vehicle is decelerating:
calculating the efficiency value based, at least in part, on an amount of regenerative braking that the hybrid vehicle is capable of executing under current operating conditions.

11. The system of claim 10, wherein the processor is further configured to at least facilitate:
calculating a second efficiency value based, at least in part, on the vehicle speed and a first known relationship correlating vehicle speed to fuel efficiency, if the operating mode indicates that the hybrid vehicle is being propelled by battery power; and
calculating the second efficiency value based, at least in part, on the vehicle speed and a second known relationship correlating vehicle speed to fuel efficiency, if the operating mode indicates that the hybrid vehicle is being propelled other than by battery power.

12. The system of claim 11, wherein the processor is further configured to at least facilitate:
measuring an engine speed;
calculating a third efficiency value, based, at least in part, on the engine speed and a known relationship correlating engine speed to fuel efficiency;
determining a measure of change in application of a brake pedal, an accelerator pedal, or both; and calculating a fourth efficiency value, based, at least in part, on the measure of change and a known relationship correlating such measure of change to fuel efficiency.

13. The system of claim 12, wherein the processor is further configured to at least facilitate:

adjusting the efficiency value depending on the operating mode of the hybrid vehicle.

* * * * *